United States Patent
Huang et al.

(10) Patent No.: US 6,948,023 B2
(45) Date of Patent: Sep. 20, 2005

(54) TRANSMISSION INTERFACE CONVERSION DEVICE

(75) Inventors: Chun Hui Huang, Hsinchu (TW); Chih Lung Liu, Hsinchu (TW)

(73) Assignee: Atop Technologies, Inc., Hsinchu (TW)

( * ) Notice: Subject to any disclaimer, the term of this patent is extended or adjusted under 35 U.S.C. 154(b) by 32 days.

(21) Appl. No.: 10/428,087

(22) Filed: May 2, 2003

(65) Prior Publication Data

US 2004/0221067 A1 Nov. 4, 2004

(51) Int. Cl.$^7$ .............................................. G06F 13/14
(52) U.S. Cl. ........................ 710/305; 371/235; 710/51
(58) Field of Search ........................... 710/62, 305, 36, 710/51; 713/400, 600; 370/64, 66, 235; 340/310.01

(56) References Cited

U.S. PATENT DOCUMENTS

| | | | | |
|---|---|---|---|---|
| 4,734,919 A | * | 3/1988 | Tae ............................. | 375/219 |
| 5,148,144 A | * | 9/1992 | Sutterlin et al. ......... | 340/310.01 |
| 5,648,984 A | * | 7/1997 | Kroninger et al. ........... | 375/211 |
| 5,956,523 A | * | 9/1999 | Chen ........................... | 710/62 |
| 6,230,224 B1 | * | 5/2001 | Kim ............................ | 710/110 |
| 6,401,159 B1 | * | 6/2002 | Wang .......................... | 710/315 |
| 6,553,076 B1 | * | 4/2003 | Huang ......................... | 375/257 |

OTHER PUBLICATIONS

RS422/485 Application Note, Chapters 1–3, www.bb-electronic.com/tech_articles, no date.*

* cited by examiner

*Primary Examiner*—Kim Huynh
(74) *Attorney, Agent, or Firm*—Rosenberg, Klein & Lee

(57) ABSTRACT

The present invention provides a transmission interface conversion device, which can first convert the communication signal of a master equipment controller and then connect to a plurality of slave devices through a pair of transmission lines so as to perform data transmission and power supply synchronously. The transmission interface conversion device includes: a conversion interface, formed by at least one repeater circuit, which transmits data by half-duplex; a signal inspector, which inspects whether a signal has been transmitted to the conversion interface; a control unit, to determine the orientation and the operation method of the repeater circuit by using the signal that has been inspected by the signal inspector; and a voltage adjustor, to supply needed electric power to all the above-mentioned circuits. The invention has features of being installed and maintained easily as well as being able to reduce the cost of cabling.

3 Claims, 3 Drawing Sheets

TRANSMISSION INTERFACE CONVERSION DEVICE

BACKGROUND OF THE INVENTION

1. Field of the Invention

The present invention relates to a transmission interface conversion device and, more particularly, to a transmission interface conversion device that is easy to be installed and maintained and able to lower the production cost.

2. Description of the Related Art

In recent years, information transmitting and receiving has been widely employed in the industrial field because of the prosperous development in information network. For example, in an industrial manufacturing processing, various interfaces applicable for measuring, controlling, meter displaying, and information collecting are often implemented in an automatic system. All these interfaces require plenty of microprocessors. Among many designs of multi-point control unit (MCU) for middle-and-long distance communication, the interface of RS-485 is remarkable for its simple hardware design, easy manipulation, and low cost. Therefore, RS-485 has been broadly used in the fields such as factory automation, industry control, information supervision, and small-section supervision.

Moreover, the Electronic Industries Association (EIA) established a standard for RS-485 in 1983 on the basis of RS-422. The standard permits RS-485 to have multipoint and bi-directional communication, which allows multiple transmitters to be connected to the same bus. Meanwhile, drive power and conflict protection of the transmitters have been increased so that the range of bus sharing mode can be expanded as well. Therefore, the physical layer of a worksite bus in a present network used in an automatic control system, such as CAN, Profibus, INTERBUS-S and ARCNet, is doing the linking and researching jobs based on the bus of RS-485.

However, the interface of a conventional RS-485 needs four transmission lines, which include one pair of electric power transmission lines and another pair of signal transmission lines, to be connected to one master equipment controller and at least one slave device so as to carry out the transmission of electric power and signals. Therefore, if a lot of small-power devices have to be linked within a small area, the cable layout will become complicated and tedious, which often results in a higher cost in worksite cable layout. Moreover, with regard to the transmission method of conventional RS-485, if a transmission line is short-circuited or an open circuit is out of order, it will be difficult to find out what goes wrong. Besides, in case a node is not working, it may also stop the transmission line from transmitting.

Thus, the cost of cable layout for the conventional RS-485 interface will be high because of the above-mentioned expenses for the installation, labor, cables and maintenance. To cope with the problems, the present invention provides a new transmission interface conversion device to solve the conventional shortcomings.

SUMMARY OF THE INVENTION

The main of the present invention is to provide a transmission interface conversion device, which employs a pair of transmission lines to transmit electric power and signal synchronously so as to replace the conventional transmission device that employs two pairs of transmission lines to transmit electric power and signal separately. By employing the device of the present invention, the worksite cabling can be reduced, and the cost of cabling can be reduced effectively as well.

Another object of the present invention is to provide a transmission interface conversion device, wherein the two transmission lines in the pair of transmission lines are easy to be identified, and in case one of the nodes in the slave device is not working, it will not affect the operation of the overall bus. In this manner, the linkage among the sectional small-power devices can be maintained easily.

Another of the present invention is to provide a transmission interface conversion device, which is capable of linking a large-scale distributed control system by simply employing a RS-485 bus as a backbone; besides, the present invention is applying a definition that the bus communication is on the physical layer; therefore, a user can build up his/her own high-level communication protocol based on the definition.

To achieve the above objects, a transmission interface conversion device of the present invention can transfer communication signals of a master control equipment, and then the device can be connected to a plurality of slave devices through a pair of transmission lines so as to perform data transmission and power supply synchronously. The transmission interface conversion device includes a conversion interface, which is composed of at least one repeater circuit and which has a tri-state output that enables the repeater circuit to transmit data by half-duplex. Besides, a signal inspector is provided to inspect whether a signal has been transmitted to the conversion interface, whereas a control unit is provided utilizing the signal that has been inspected by the signal inspector to determine the orientation and operation method for the repeater circuit. In addition, a voltage adjustor provides at least two sets of electric power to separately supply the needed power of each circuit.

The objects and technical contents of the present invention will be better understood through the description of the following embodiment with reference to the drawings.

DESCRIPTION OF THE PREFERRED EMBODIMENTS

The present invention employs the property of RS-485 that has a half-duplex interface, utilizes the mechanism of a bus that sets up a master equipment controller to control all the slave devices of the bus, employs the design of RS-485 repeater circuit, and utilizes the RS-485 bus as a backbone to transmit data to the slave devices through the conversion made by the repeater circuit.

Figure 1:
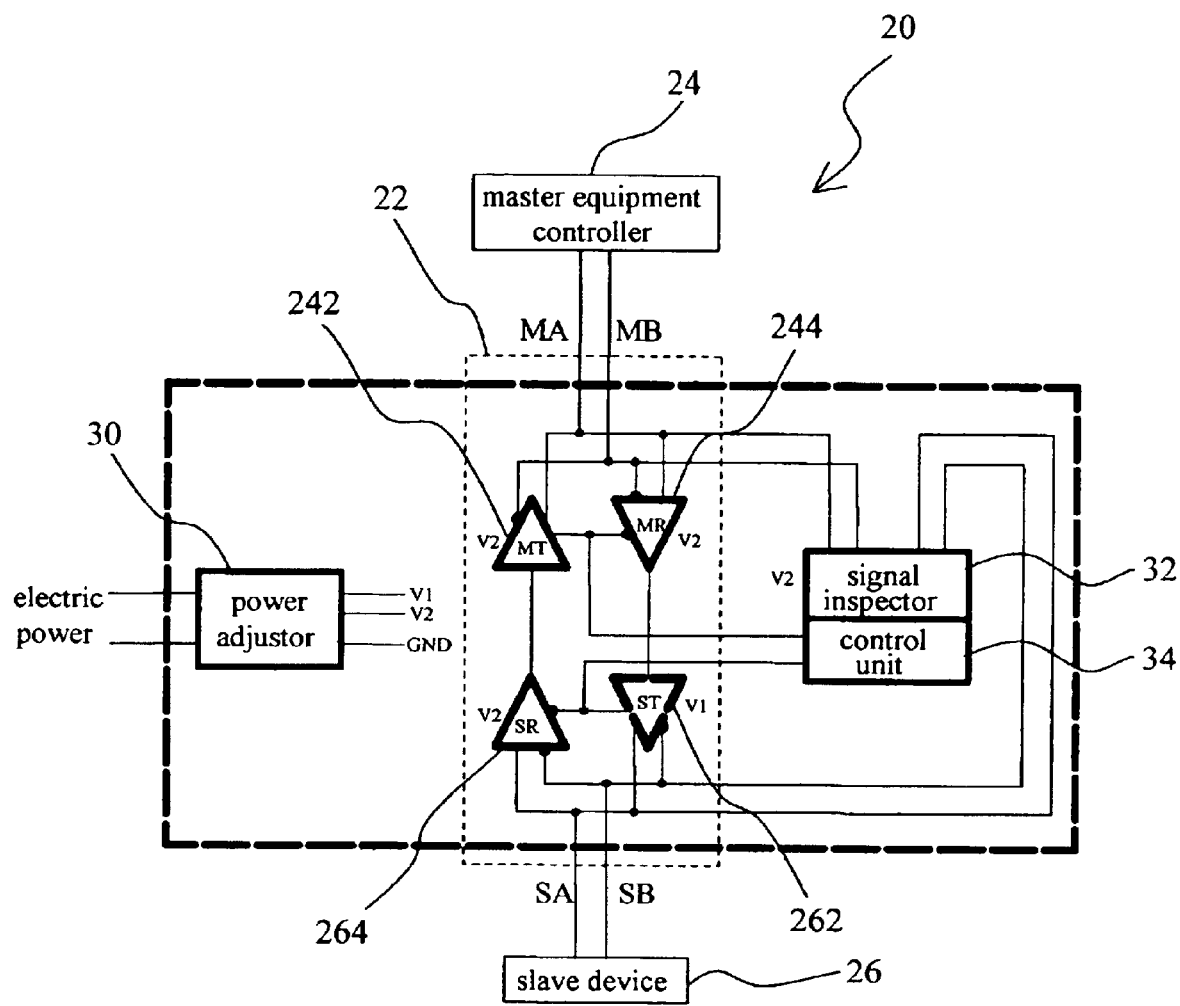
FIG. 1 is a block schematic diagram showing the configuration of the present invention.

As shown in FIG. 1, a transmission interface device 20 is connected to a master equipment controller 24 and at least one slave device 26 through a pair of transmission lines composed of twisted pair cable so as to transmit data and supply electric power. The transmission interface device 20 includes firstly a conversion interface 22 that is composed of a repeater circuit, wherein the repeater circuit comprises a transmitter MT 242 and a receiver MR 244 that are used at the master equipment controller 24 and also comprises a drive transmitter ST 262 and receiver SR 264 at the slave device 26; besides, since the repeater circuit has a tri-state output, it can transmit data by half-duplex; secondly a signal inspector 32, which is used to inspect whether a signal has been transmitted to the conversion interface 22; thirdly a control unit 34, which is used to determine the orientation for the repeater circuit by using the signal that has been inspected by the signal inspector 32, and the control unit 34 also determines the operation method for the two transmitters 242 & 262 and the two receivers 244 & 264 as well as controls the master equipment controller 24 or the slave device 26 for being in a transmission mode or a receiving mode; finally a voltage adjustor 30, which provides at least two sets of electric power, wherein the first power set V1 provides power to the drive transmitter ST 262 of the slave device 26, whereas the second power set V2 provides power to the other circuits; besides, the output voltage of the first power set V1 is two times as much as the output voltage of the second power set V2.

In particular, the conversion interface 22 applies the voltage differentiation between the two ends of MA/MB or SA/SB to determine the logic 0/1 law. If MA>MB or SA>SB, the situation goes to logic 1. Conversely, if MA<MB or SA<SB, the situation goes to logic 0. Therefore, when the signal inspector 32 has detected that a signal has been transmitted to the conversion interface 22, the inspected signal will be outputted by logic 1. On the contrary, if the signal inspector 32 has not detected any signal, the output is done by logic 0. In this manner, the output can be provided to the control unit 34 to determine the orientation of the repeater circuit. Therefore, when the signal inspector 32 has detected that a signal has been transmitted from the master equipment controller 24, it means that the direction of the repeater circuit is to be transmitted from the master equipment controller 24 to the slave device 26. Therefore, the data can be received by the master equipment controller 24 and transferred to each of the components that are driving the slave device 26. Conversely, when the signal inspector 32 has detected that there is no signal from the master equipment controller 24, the data transmission will be stopped. On the other hand, if the signal inspector 32 has firstly detected that the signal is from the slave device 26, the data will be received by each of the components of the slave device 26 and transferred to the master equipment controller 24. In this manner, the inspection will be repeated until there is no more signal from the slave device 26.

Moreover, when data is being downloaded, a voltage with higher power will charge the capacitor of slave device 26 at the same time; conversely, when data is being uploaded, there will not be a charge action, and data will be returned by the power discharged by the capacitor. Therefore, the reason to design the voltage that V1 is two times as much as V2 in the power adjustor 30 is that V1 provides power to the drive transmitter 262 of the slave device 26. On the other hand, the drive transmitter 262 must provide capacitor charge to the components that are connected to the slave device 26 so that the components can use the electric energy stored in the capacitor to support circuit operation and data uploading, which also means the output has to be with large power. Therefore, the large-power drive transmitter 262 has to be employed, and that is why the voltage of V1 must be two times larger than that of V2. In addition, because the electrical potential of the signal uploaded by the components connected to the slave device 26 is much smaller than the electrical potential stored in the slave device 26, the signal will not be lost; therefore, the signal return will not be affected. Thus, the energy stored in the capacitor can perform data return so as to achieve the purpose of using only one twisted pair cable for transmitting.

Figure 2:
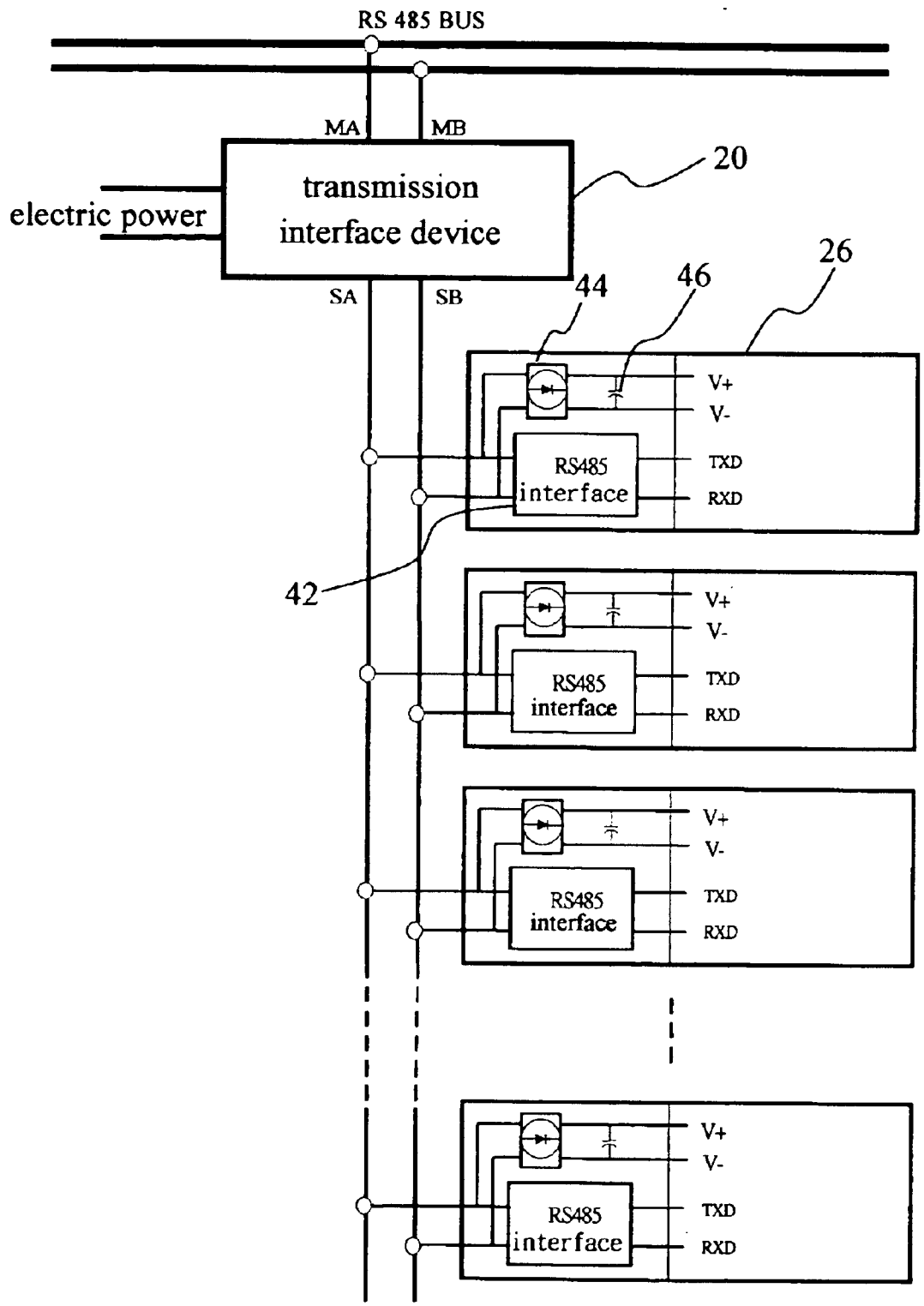
FIG. 2 is a block schematic diagram showing the linkage among a plurality of slave devices by applying the present invention.

Also, the invention can further utilize RS-485 bus as a backbone and transmit data to the plurality of slave device 26 through the conversion of repeater circuit, as shown in FIG. 2. The data is transmitted by a level that is two-times higher than the balanced high driving force, and the data is received by the interface 42 of RS-485 from the slave device 26. Meanwhile, a bridge rectifier 44 and a large filter capacitor 46 located inside the slave device 26 are used to obtain the electric energy for operation from the slave device 26.

Figure 3:
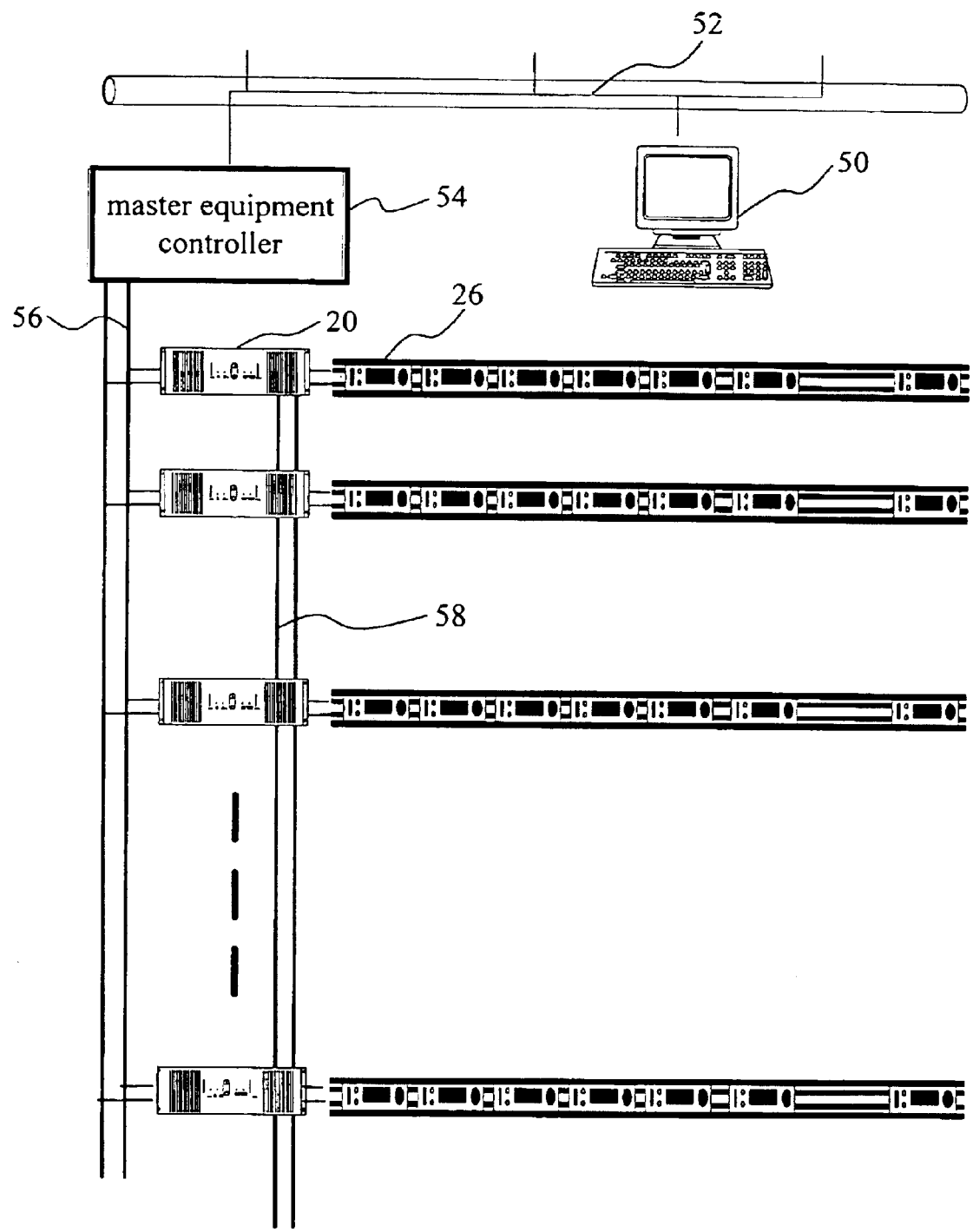
FIG. 3 is a diagram showing an embodiment of linking a large-scale distributed control system by applying the present invention.

Furthermore, the master equipment controller and the slave device can employ the RS-485 bus synchronously as a backbone and link the devices shown in FIG. 2 into a large-scale distributed control system easily, as shown in FIG. 3. Referring to FIG. 3, a main computer 50 sends out a signal, and through an Ethernet network 52, the data is transmitted to a master equipment controller 54. Then, the master equipment controller 54 will use the RS-485 bus 56 as a backbone to distribute data to each transmission interface conversion device 20. After that, the transmission interface conversion devices 20 will transfer data to a plurality of slave devices 26, and the power line 58 will supply needed power to each transmission interface conversion device 20. In addition, the invention applies a definition that the bus communication is on the physical layer; therefore, a user can build up his/her own high-level communication protocol based on the definition, which can be widely employed in the industry.

The invention provides a transmission interface conversion device that employs a pair of transmission lines for transmission so that the device can replace a conventional device that employs two pairs of transmission lines for transmission. Thus, the worksite cabling can be reduced as well as the cabling cost can be reduced effectively. Besides, the two transmission lines in the pair of transmission lines are easy to be identified, and in this manner, the linkage among the sectional small-power devices can be maintained easily. Moreover, the RS-485 bus can be used as a backbone to link the devices of the invention into a large-scale distributed control system easily. In addition, since the invention applies a definition that the bus communication is on the physical layer, a user can build up his/her own high-level communication protocol based on the definition.

The embodiment above is only intended to illustrate the invention; it does not, however, to limit the invention to the specific embodiment. Accordingly, various modifications and changes can be made without departing from the spirit and scope of the invention as described in the appended claims.

What is claimed is:

1. A transmission interface conversion device, which can first convert the communication signal of a master equipment controller and then connect to a plurality of slave devices through a pair of transmission lines so as to perform data transmission and power supply synchronously, comprising:

a conversion interface, which is composed of at least one repeater circuit that has a tri-state output so that the repeater circuit can transmit data by half duplex, wherein said repeater circuit is composed of at least two sets of transmitters and receivers, wherein the two sets of transmitters and receivers is used as the transmitter and receiver of the master equipment controller and another set of transmitter and receiver is used as die drive transmitter and the receiver of the slave device;

a signal inspector inspecting whether a signal has been transmitted to the conversion interface;

a control unit determining the orientation and the operation method of the repeater circuit by using the signal inspected by the signal inspector; and a voltage adjuster provided at least two sets of electric power so as to supply the needed power to all above-mentioned circuits, wherein the first set of the two sets of electric power is to supply needed power to the drive transmitter of the slave device, whereas the second set of electric power is to supply the needed power to the circuits other than the drive transmitter, and further wherein the output voltage of the first set of power is higher than that of the second set of power.

2. The transmission interface conversion device as claimed in claim 1, wherein said conversion interface uses EIA RS-485 as its transmission interface.

3. The transmission interface conversion device as claimed in claim 1, wherein the control unit can further control the master equipment controller or the slave device to be either in a transmitting mode or a receiving mode.

* * * * *